United States Patent
Pettitt et al.

(10) Patent No.: US 10,018,902 B2
(45) Date of Patent: Jul. 10, 2018

(54) PROJECTOR LIGHT SOURCE AND SYSTEM, INCLUDING CONFIGURATION FOR DISPLAY OF 3D USING PASSIVE VIEWING GLASSES

(71) Applicant: Texas Instruments Incorporated, Dallas, TX (US)

(72) Inventors: Gregory S. Pettitt, Farmersville, TX (US); John M. Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 303 days.

(21) Appl. No.: 14/882,743

(22) Filed: Oct. 14, 2015

(65) Prior Publication Data

US 2016/0033854 A1  Feb. 4, 2016

Related U.S. Application Data

(63) Continuation of application No. 13/652,129, filed on Oct. 15, 2012, now Pat. No. 9,195,123.
(Continued)

(51) Int. Cl.
*G03B 35/22* (2006.01)
*G03B 21/20* (2006.01)
(Continued)

(52) U.S. Cl.
CPC ............... *G03B 35/22* (2013.01); *F21V 9/08* (2013.01); *G02B 26/008* (2013.01); *G02B 27/141* (2013.01); *G02B 27/2207* (2013.01); *G02B 27/2264* (2013.01); *G03B 21/204* (2013.01); *G03B 21/2013* (2013.01); *G03B 21/2053* (2013.01); *G03B 21/2066* (2013.01); *G03B 35/16* (2013.01); *G03B 35/26* (2013.01); *H04N 9/3111* (2013.01); *H04N 9/3158* (2013.01); *H04N 9/3161* (2013.01); *H04N 9/3164* (2013.01); *H04N 13/0431* (2013.01); *H04N 13/0434* (2013.01); *H04N 13/0459* (2013.01)

(58) Field of Classification Search
CPC .. G02B 26/008; G02B 27/22; G03B 21/2033; G03B 21/204; G03B 21/2013; F21V 9/08
USPC .......................................................... 362/84
See application file for complete search history.

(56) References Cited

U.S. PATENT DOCUMENTS 6,283,597 B1 * 9/2001 Jorke ................. G02B 27/2207
                                                                  348/766
7,070,300 B2    7/2006 Harbers et al.
(Continued)

*Primary Examiner* — William N Harris
(74) *Attorney, Agent, or Firm* — Michael A. Davis, Jr.; Charles A. Brill; Frank D. Cimino

(57) ABSTRACT

An imaging system using a spatial light modulator has first color laser light directed by a dichroic element to a rotating member. The rotating member includes phosphor segments that respond to illumination by the first color light to emit second and third color light along a first path to the dichroic element for output, and a light transmitting segment that passes the first color through the rotating member along a second path to the dichroic element for output. In a 3D imaging mode, the first color laser light includes light of two wavelengths, and the phosphor segments include segments that emit second and third color light each of two wavelengths. The output light is directed to a second rotating member that selectively transmits one wavelength of each color while blocking the other wavelength of each color.

22 Claims, 14 Drawing Sheets

Related U.S. Application Data

(60) Provisional application No. 61/546,915, filed on Oct. 13, 2011.

(51) Int. Cl.
    *F21V 9/08*     (2018.01)
    *G03B 35/16*    (2006.01)
    *H04N 9/31*     (2006.01)
    *G02B 26/00*    (2006.01)
    *G02B 27/14*    (2006.01)
    *G02B 27/22*    (2018.01)
    *G03B 35/26*    (2006.01)
    *H04N 13/04*    (2006.01)

(56) References Cited

U.S. PATENT DOCUMENTS

| | | | |
|---|---|---|---|
| 7,547,114 B2 * | 6/2009 | Li | G03B 21/204 353/20 |
| 7,845,802 B2 | 12/2010 | Ikeda et al. | |
| 8,646,947 B2 * | 2/2014 | Li | H04N 9/3114 362/293 |
| 8,662,673 B2 | 3/2014 | Miyazaki | |
| 2005/0134808 A1 * | 6/2005 | Pettitt | G02B 26/008 353/84 |
| 2006/0285217 A1 | 12/2006 | Roth | |
| 2007/0019408 A1 | 1/2007 | McGuire, Jr. et al. | |
| 2009/0187234 A1 * | 7/2009 | Meyer | C09K 11/06 607/88 |
| 2009/0262308 A1 | 10/2009 | Ogawa | |
| 2009/0284148 A1 | 11/2009 | Iwanaga | |
| 2010/0066813 A1 * | 3/2010 | Jorke | H04N 13/0033 348/46 |
| 2010/0326628 A1 | 12/2010 | Masuda | |
| 2010/0328626 A1 | 12/2010 | Miyazaki | |
| 2010/0328632 A1 | 12/2010 | Kurosaki et al. | |
| 2013/0070205 A1 * | 3/2013 | Pan | H04N 9/3117 353/31 |
| 2013/0088689 A1 * | 4/2013 | Lin | G03B 21/204 353/31 |
| 2017/0045810 A1 * | 2/2017 | Huang | G03B 21/204 |

* cited by examiner

WHEEL SEGMENTATION

PHOSPHOR WHEEL

3D COLOR WHEEL

PROJECTOR LIGHT SOURCE AND SYSTEM, INCLUDING CONFIGURATION FOR DISPLAY OF 3D USING PASSIVE VIEWING GLASSES

Under 35 U.S.C. §§ 119(e), 120, this continuation application claims the benefits of and priority to U.S. patent application Ser. No. 13/652,129, filed on Oct. 15, 2012, which also claims the benefit of and priority to U.S. Provisional Application No. 61/546,915, filed on Oct. 13, 2011. The entirety of the above parent applications are incorporated herein by reference.

BACKGROUND

This relates to image projection systems and light sources usable with image projection systems.

There is a commercial need to provide a solid-state long lifetime light source that can create and illuminate a spatial light modulator (SLM) with enough lumens to be useful for mainstream data projectors.

There is a commercial need to provide projector systems using such a light source.

SUMMARY

Disclosed is a projector light source and projector system utilizing a hybrid laser and fluorescent emission light source. Also disclosed is an implementation of the light source and system for display of three-dimensional images.

DETAILED DESCRIPTION OF EXAMPLE EMBODIMENTS

Figure 1:
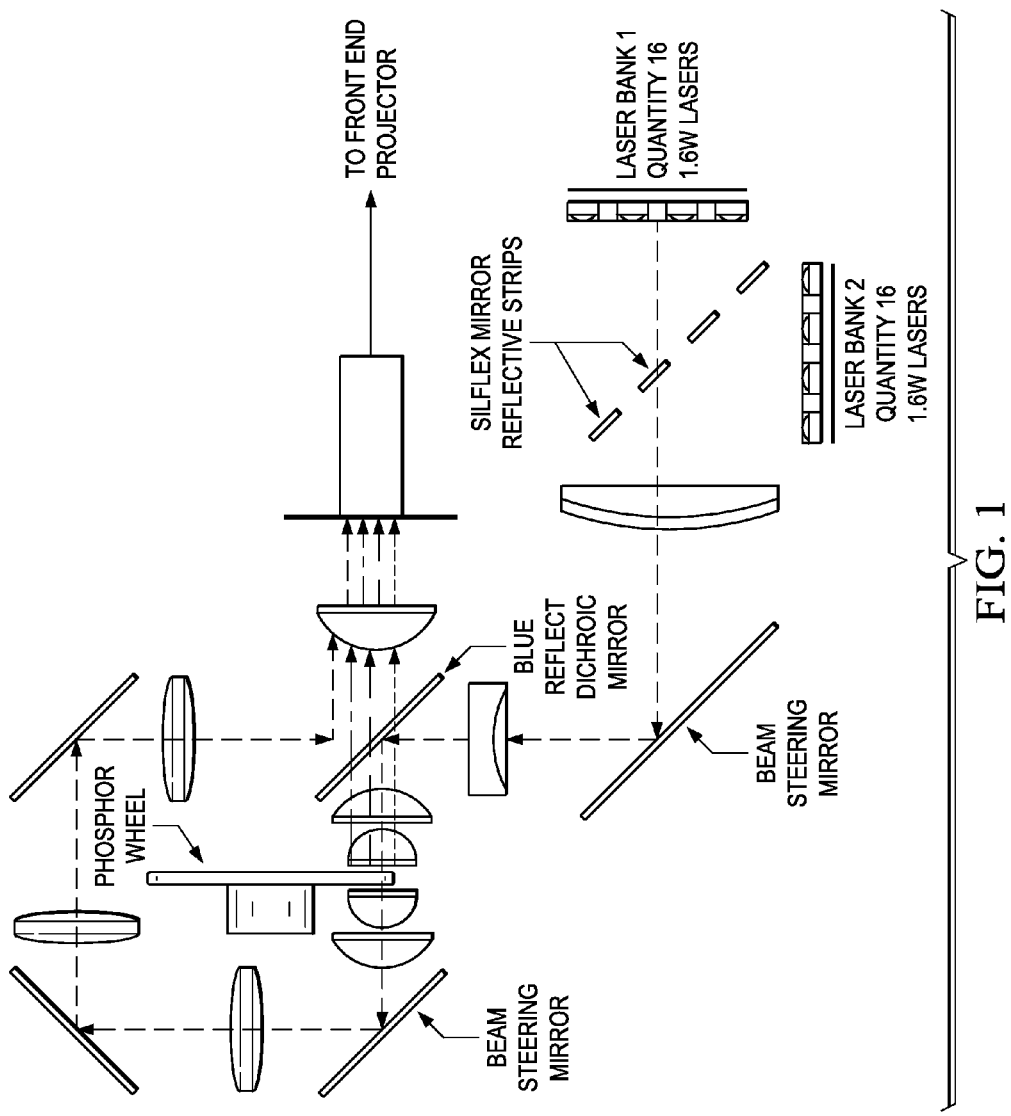
FIG. 1 illustrates an example implementation of a laser pumped phosphor illuminator.

FIG. 1 illustrates an example implementation of a laser pumped phosphor illuminator. The illuminator includes laser banks 1 and 2, each with 16 1.6 W blue lasers, Silfiex mirror reflective strips, beam steering mirrors, a blue reflect dichroic mirror, a color wheel, and lenses arranged as shown.

Figure 2:
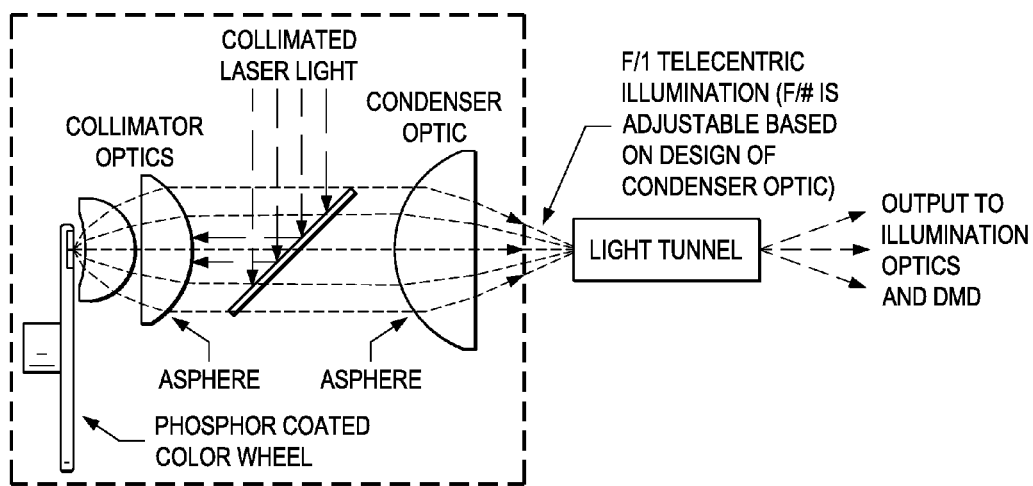
FIG. 2 illustrates the collector optics of the illuminator of FIG. 1.

FIG. 2 illustrates the collector optics of the illuminator of FIG. 1. Collimated blue laser light is injected into the optics, reflected by one side of a blue dichroic mirror and focused by an asphere lens onto the color wheel which includes angularly spaced different wavelength red, green and yellow (R, G, Y) color emitting phosphor segments and light transmissive segments or openings. Light emissions from the R, G, Y color emitting phosphor segments are collected by a set of collection optics, passed through the blue dichroic mirror, and focused by another asphere lens onto a light tunnel. The phosphor segments may take the form of spots of phosphor powder applied to the wheel. The spots are kept small (~2 mm) for optimal light collection into the tunnel.

Figure 3:
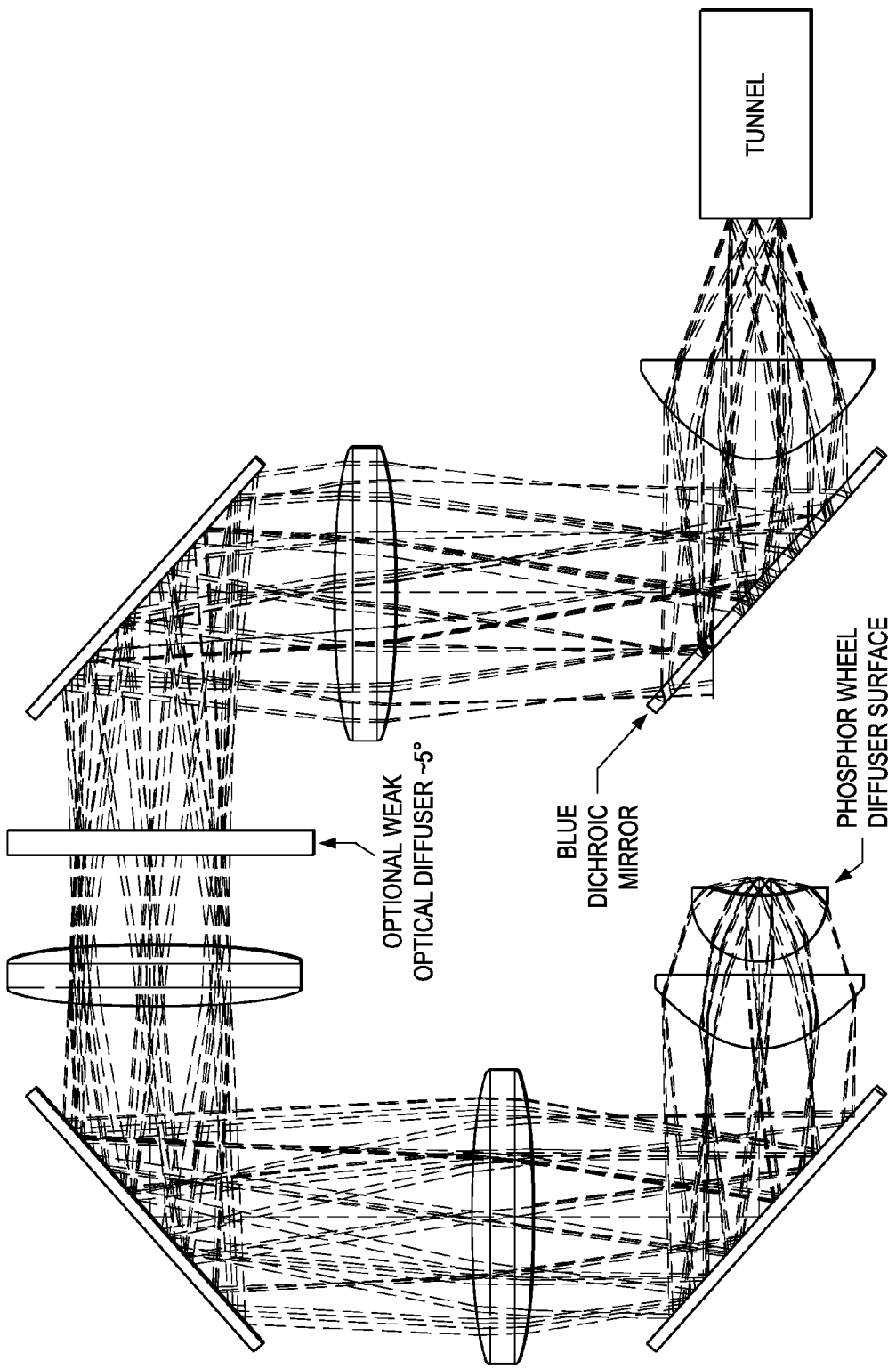
FIG. 3 illustrates the blue relay path.

Blue (B) laser light transmitted through the light transmissive segments or openings is passed though the color wheel and directed via beam steering mirrors and optics to the other side of the blue dichroic mirror, from which it is reflected for focusing using the same other asphere lens onto the light tunnel. (The blue dichroic mirror passes the wavelengths of the red, green and yellow phosphor emissions, but reflects the wavelength of the blue laser light.) In the described example, the blue light relay path uses the direct laser blue light (445 nm or 460 nm) as a blue source. Laser beams are scattered by a diffuse transmissive section of phosphor wheel and routed around to reflect off the blue dichroic mirror. In the illustrated arrangement, the light path of the transmitted blue light recombines with (i.e., realigns with) the light path of the red, green and yellow light before the condenser lens. The relay optics takes the form of a 1:1 pupil relay and maintains magnification of the system. A static diffuser is an alternative to a wheel diffuser located at or near an intermediate image plane. The blue relay path is illustrated in FIG. 3. A weak optical diffuser may be included in the blue light relay path.

The output from the light tunnel is directed to illumination optics and onto an N×M array of individually addressable light pixel switches of a spatial light modulator, such as an N×M array of micromirrors of a digital micromirror device (DMD) (e.g., a DLP™ device from Texas Instruments). The color wheel rotates in synchronism with operation of the light pixel switches to project the red, green, yellow and blue light for integration into a composite color image on a display surface.

Figure 4:
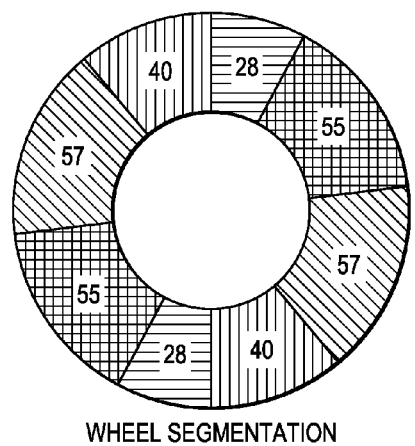
FIGS. 4-6 illustrate an example wheel segmentation and related characteristics for the R, G, Y and B segments of the color wheel.
Figure 5:
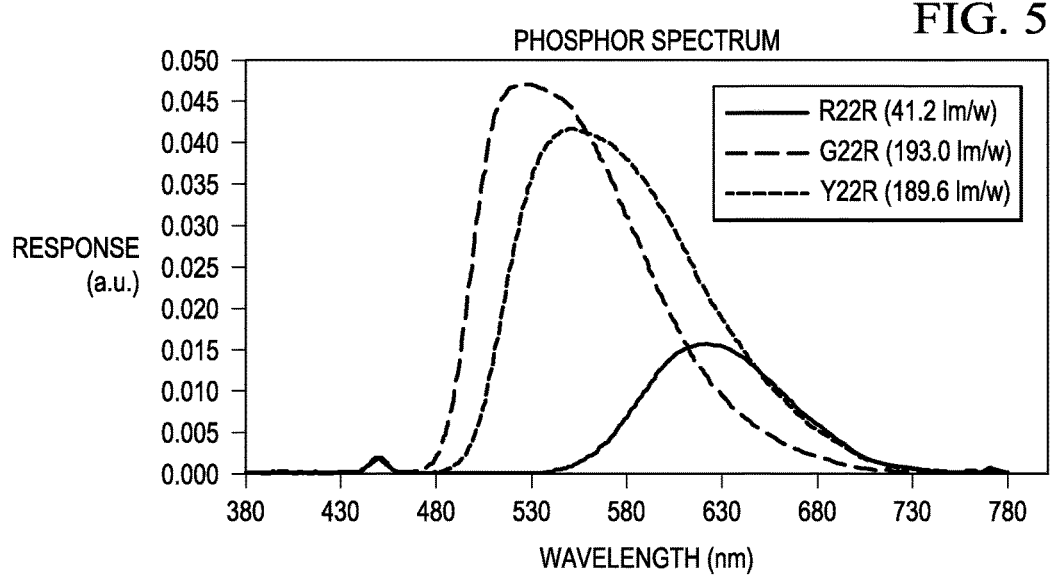
Figure 6:
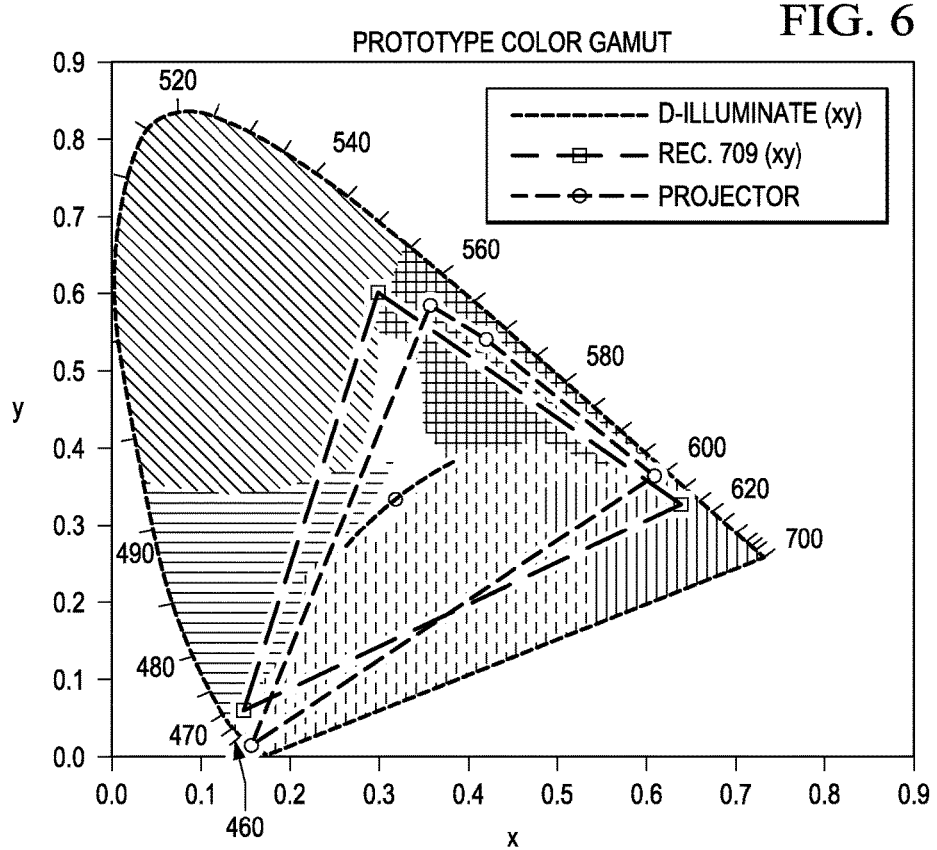

FIGS. 4-6 illustrate an example wheel segmentation and related characteristics for the R, G, Y and B segments of the color wheel. As shown in FIG. 4, a circumferential serial arrangement of segments may be a twice repeated same sequence of 55° Y (yellow segment 55), 57° G (green segment 57), 40° R (red segment 40), and 28° B (blue segment 28). An example wavelength spectrum selection for selection of phosphors is shown in FIG. 5 wherein G (tallest curve with leftmost peak) has a response of 0.045-0.05 a.u. at a wavelength of 480-530 nm, Y (next tallest curve with middle peak) has a response of 0.04-0.045 a.u. at a wavelength of 530-580 nm, and R (shortest curve with rightmost peak) has a response of about 0.015 a.u. at a wavelength of around 630 nm. FIG. 6 shows an example color gamut. Use of yellow as a fourth color enables a good balance between the large amount of blue available in the system, and helps provide a good white point. The time sequential nature of imaging using segments of a rotating color wheel allows for phosphor spectral overlap (i.e., can use yellow). The algorithm used for imaging may be the same as used in the BrilliantColor™ system.

Figure 7:
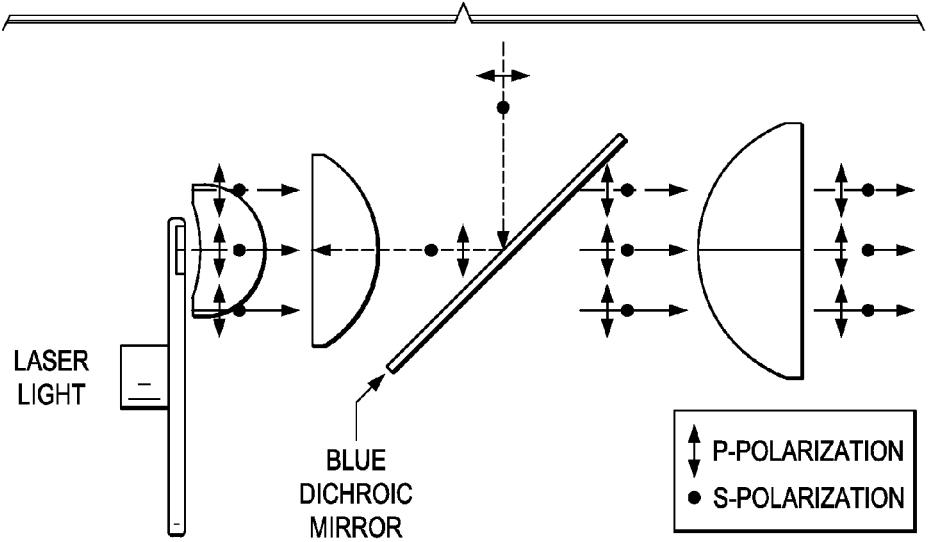
FIGS. 7-8 give arrangement and characteristics of the dichroic mirror.
Figure 8:
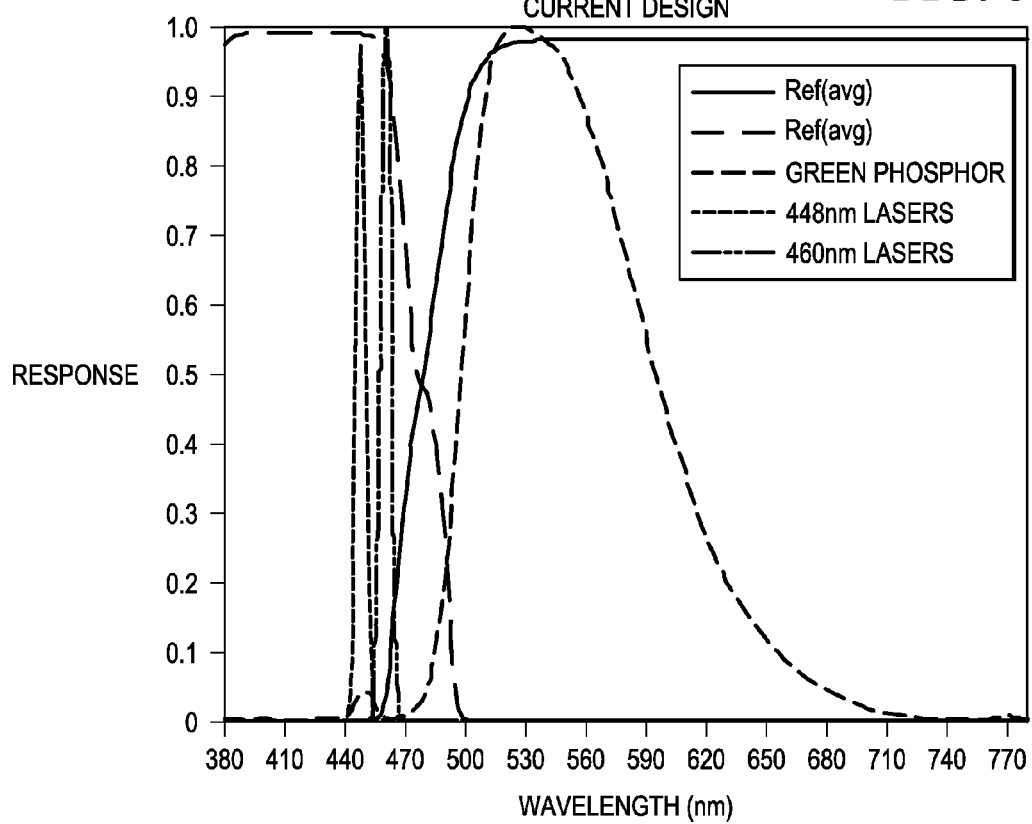

The dichroic mirror, shown schematically in FIG. 7 (blue shown going down and to the left; green on top, yellow in the middle, and red on the bottom shown going to the right in three places), is configured for reflecting the blue laser light, but for transmitting the green, yellow and red phosphor wavelengths. The design of the mirror is preferably chosen to give filter cutoffs, shown by the example curves in FIG. 8, which will maximize laser throughput assuming random polarization state of the laser and phosphor emissions. The illustrated design (see FIG. 8) has response characteristics chosen for use with 445 nm laser input light.

The illustrated light source arrangement may be implemented without additional electronics drivers or cooling elements needed for LED sources. Although other arrangements may be used, the illustrated example uses a single dichroic fold mirror for filtering phosphors, directing laser light to phosphors and recombining blue laser light with the phosphor emitted RGY light. The use of laser light and phosphor emissions as described enables the creation of a brighter light source (more lumens) in a small etendue than when LED sources are used. Brightness may be increased by increasing the amount laser power than is incident on the phosphor surface before thermal quenching occurs. The color wheel (i.e., phosphor wheel) may be implemented using a reflective metal substrate surface to minimize thermal quenching by removing heat from the phosphor. The use of inherent laser polarization relaxes the requirements on the dichroic fold mirror.

The described architecture may be augmented to enable using a spatial light modulator such as a DLP™ digital micromirror device for the projection of images which are viewable in three dimensions (3D) using passive viewing glasses. Unlike 3D imaging approaches that require active glasses, passive viewing glasses do not require power to the eyewear, do not require synchronization of left and right eyewear shutters, and have a lower eyewear cost.

The described light source provides a projector utilizing multiple colors (RGBY), having filtering of phosphor pump light from the individual colors, and providing enough lumens in a small etendue which is suitable for use as a light source for small spatial light modulators.

Figure 9:
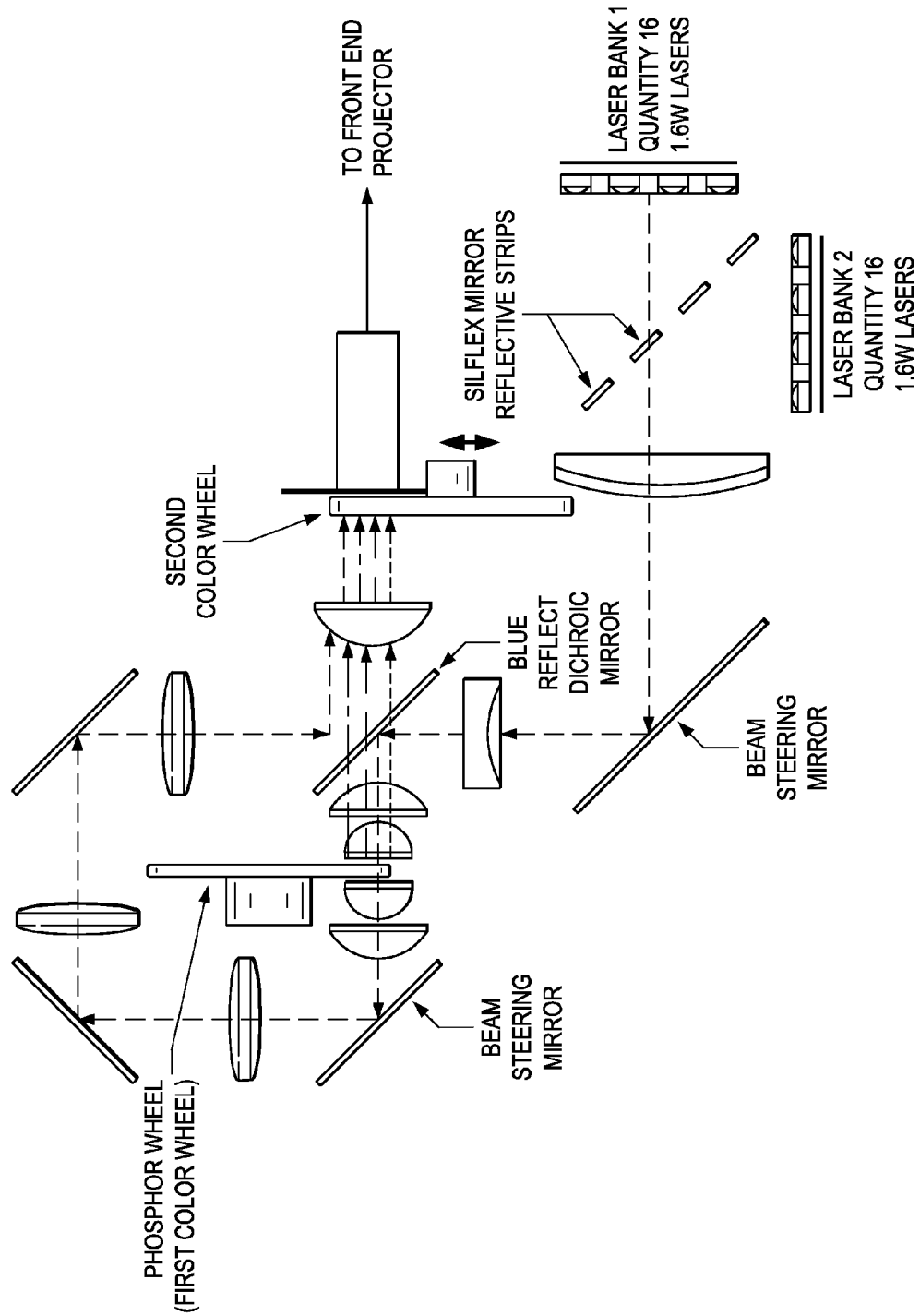
FIG. 9 illustrates the illuminator of FIG. 1, augmented for 3D imaging.

An example augmented architecture of a laser pumped phosphor illuminator usable for 3D imaging is shown in FIG. 9. The general arrangement is similar to that previously described with reference to the arrangement shown in FIG. 1; however, the color wheel and laser light sources are modified to provide two wavelength selectable sources for each R, G, Y and B color and a way for time sequentially alternating between the two sets of colors.

Wavelength selection 3D creates the left and right eye images by providing two of each color displayed. The illustrated architecture utilizes a time sequential wavelength selection process in which two blues, two reds, and two greens are produced, one for each eye. The two blues are provided by utilizing blue light lasers of different wavelengths, one bank of lasers emitting light at 448 nm wavelength and one bank of lasers emitting light at 460 nm wavelength, to provide both the light sources for pumping the phosphor conversion wheel and the two blue colors. The banks are individually electronically controlled to produce the different blue colors, with either or both laser wavelengths usable to illuminate and excite the phosphors.

As shown in FIG. 9, a second wheel may be placed in the optical path just before the integrator rod (light tunnel, above). The wheel includes filters for time sequentially blocking or transmitting a selected one of each of the two wavelengths for each color.

The second color wheel may be arranged for relative movement into or out of the projection optical path, for switching between 3D image and 2D image projection modes.

Figure 10:
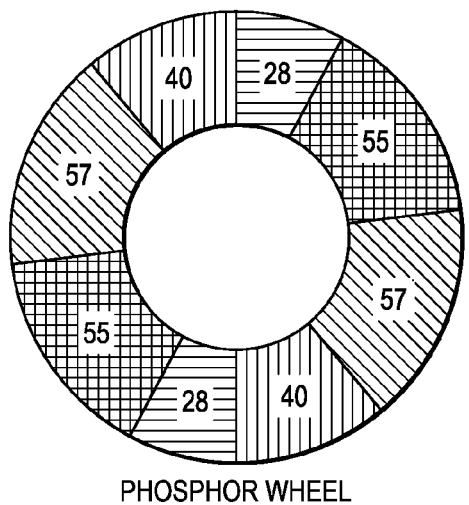
FIGS. 10 and 11 show examples of the phosphor and filter wheels for the system of FIG. 9.
Figure 11:
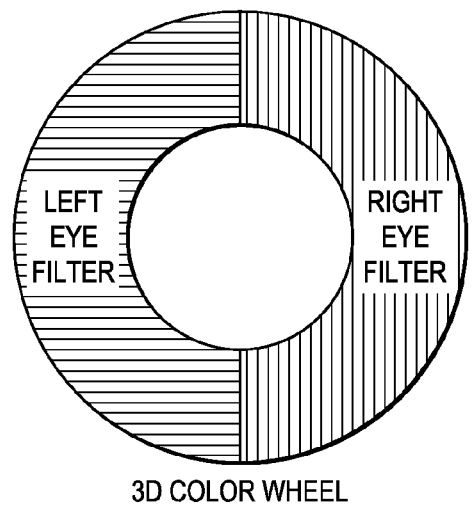

The first and second color wheels for the system of FIG. 9 are shown in FIGS. 10 and 11.

The first wheel (the phosphor conversion wheel) shown in FIG. 10 may have a segmentation arrangement similar to that described previously for the wheel shown and described with reference to FIGS. 4-6. The phosphors and sequences may be as previously described.

The second wheel (wavelength filter wheel) has two sections as shown in FIG. 11: a left eye wavelength filter and a right eye wavelength filter. The second wheel is synchronized with the first wheel, so that B, Y, G and R light of a first wavelength (or first set of wavelengths) for each color is passed by the filter in synchronism with the modulation of the spatial light modulator pixel switches for the left eye image and B, Y, G and R light of a second wavelength (or second set of wavelengths) for each color is passed in synchronism with the modulation of the spatial light modulator pixel switches for the right eye image. (The glasses have left and right lenses with corresponding left and right image wavelength filtering.) The output may, for example, be a 120 Hz left/right cadence of 3D image frames.

The phosphors provide a large wavelength response which is useful in the wavelength selection process. The blue wavelengths may be coordinated so that only one wavelength laser emits light at a time (synchronized with the left/right filtering), or both wavelengths may be emitted with the second (filter) wheel serving to pass only the blue wavelength corresponding to the currently images left or right eye modulation.

FIGS. 12-20 give example parameters for the phosphors and filters used in the first and second wheels and corresponding left and right lenses of the glasses.

Figure 12:
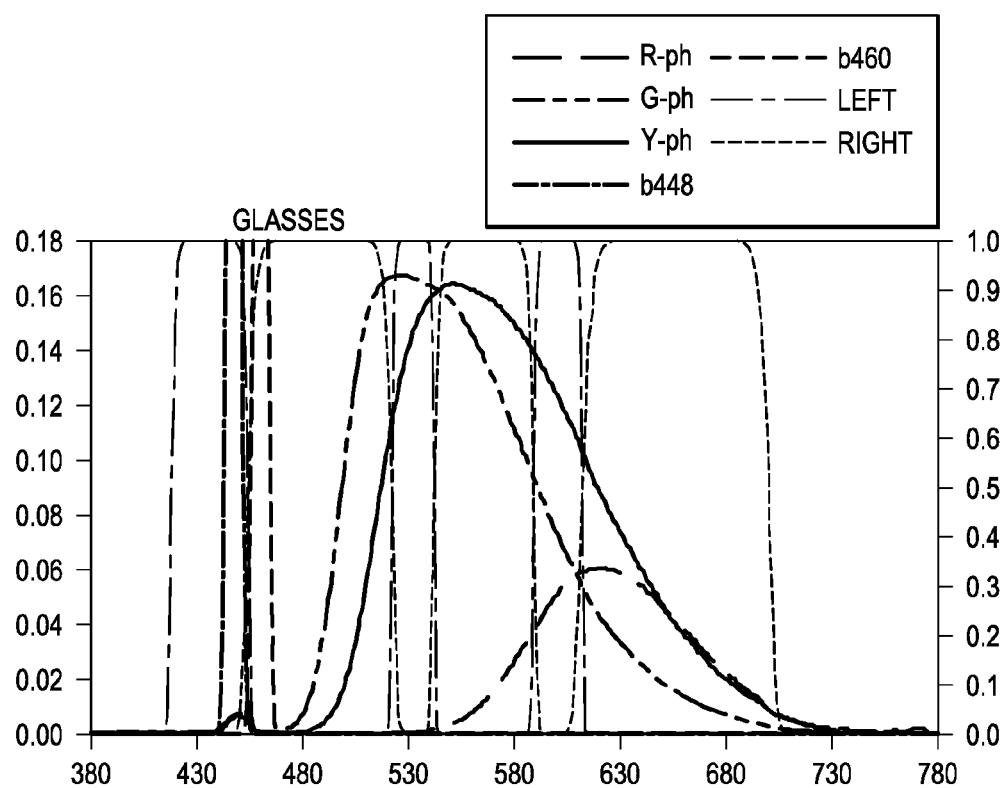
FIGS. 12-20 give example parameters for the phosphors and filters used in the first and second wheels and corresponding left and right lenses of the glasses.

FIG. 12 shows the spectral energy of the phosphors and lasers with the filters overlaid.

Figure 13:
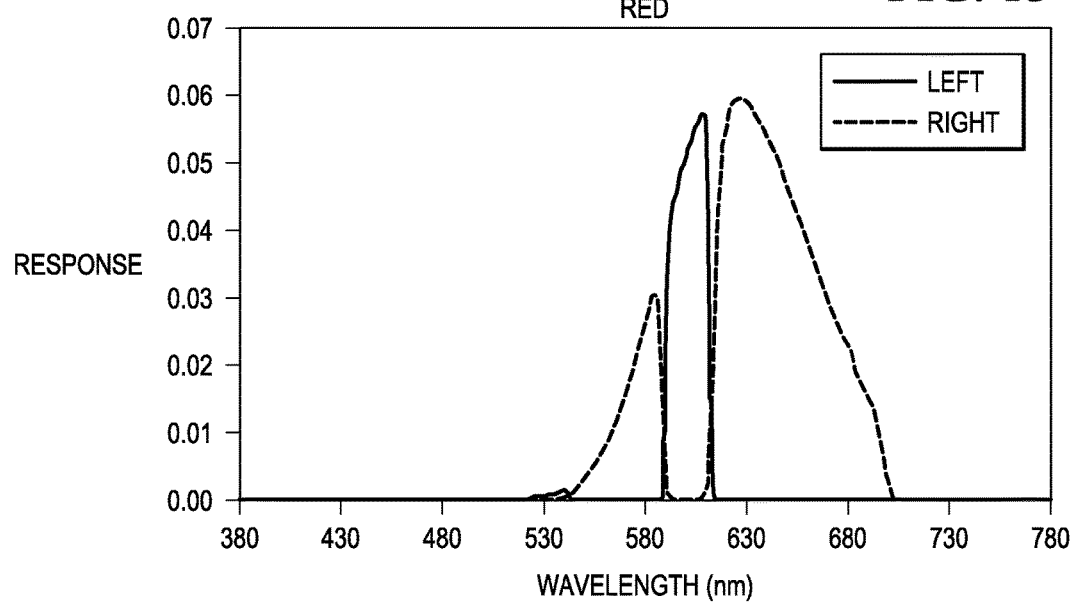
Figure 14:
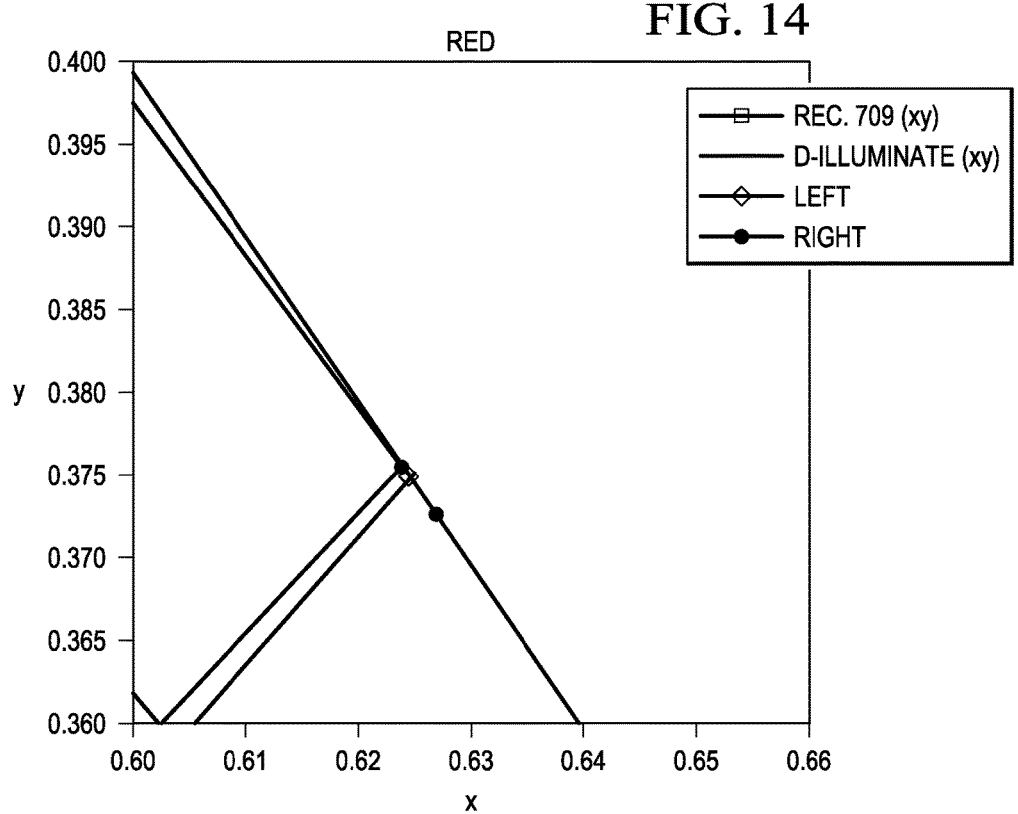
Figure 15:
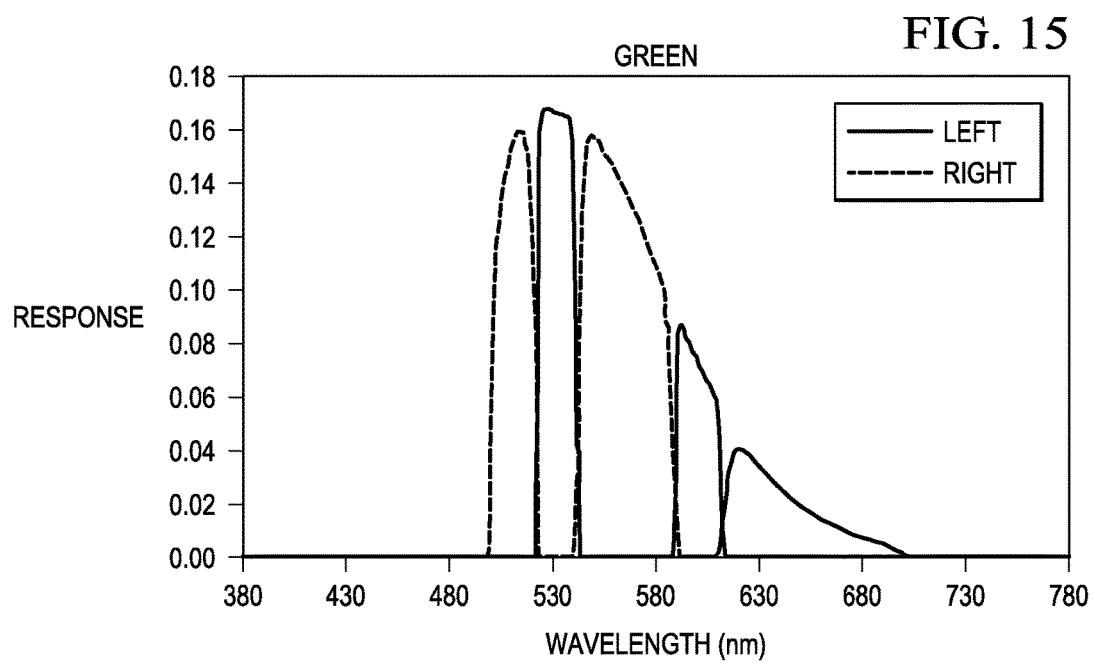
Figure 16:
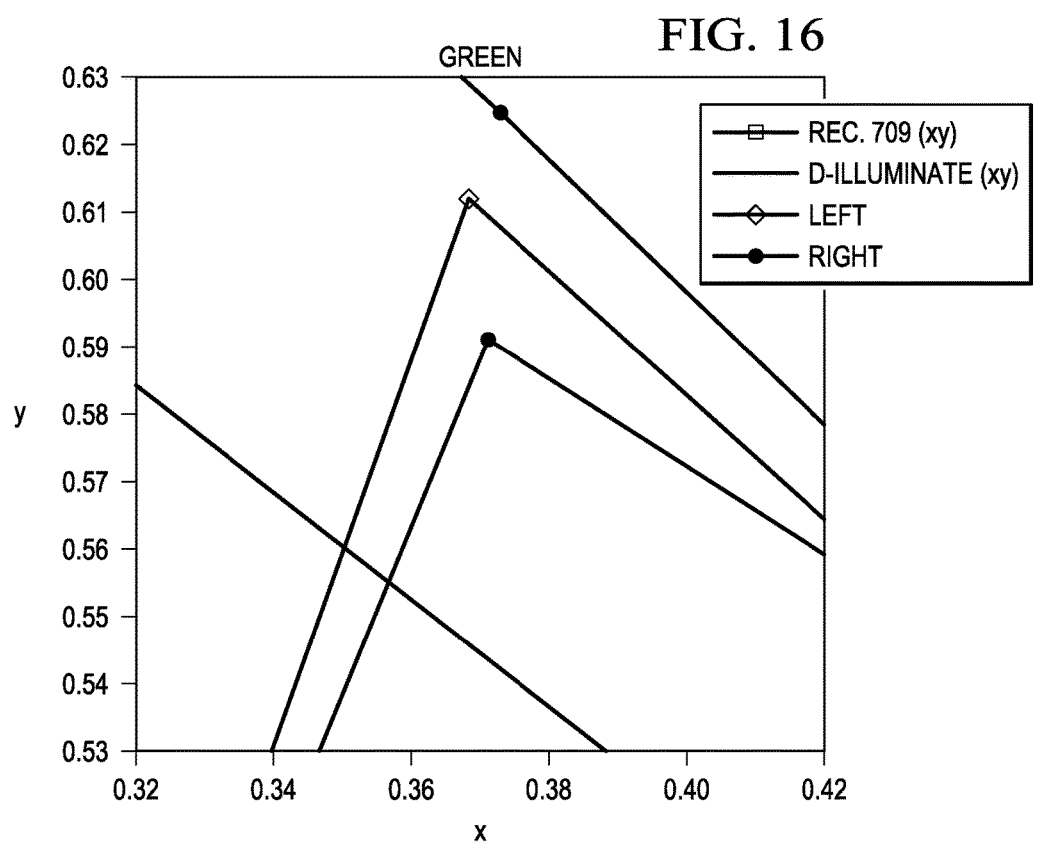
Figure 17:
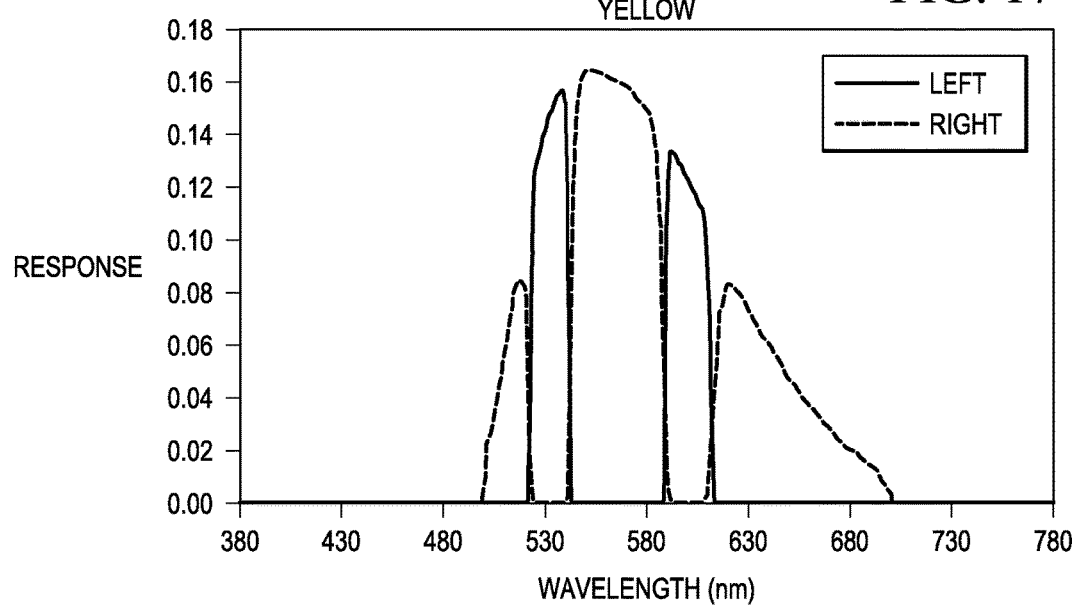
Figure 18:
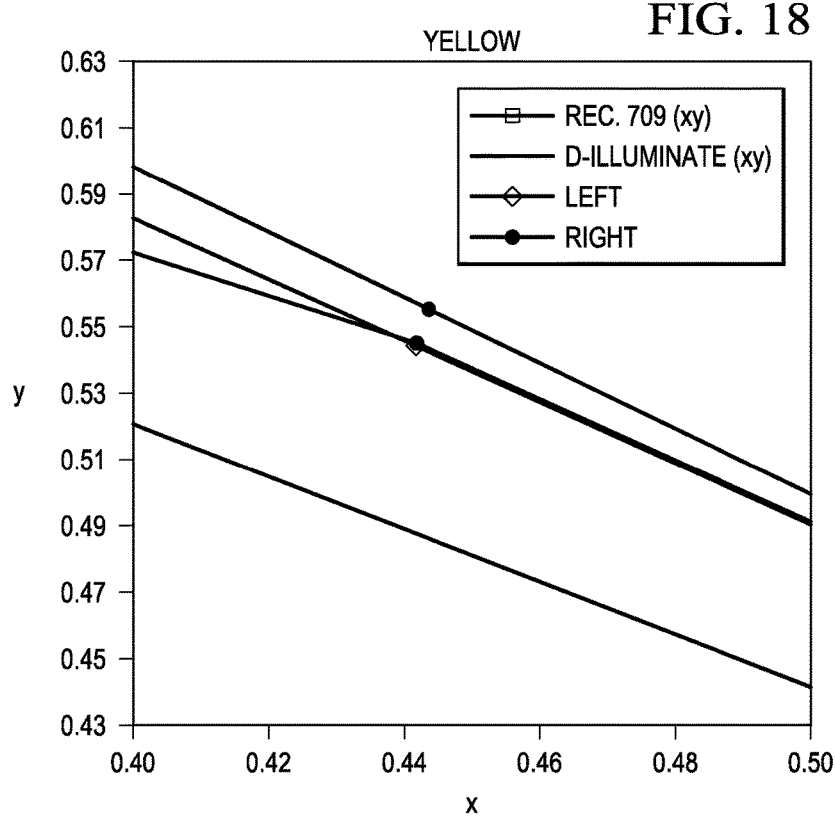
Figure 19:
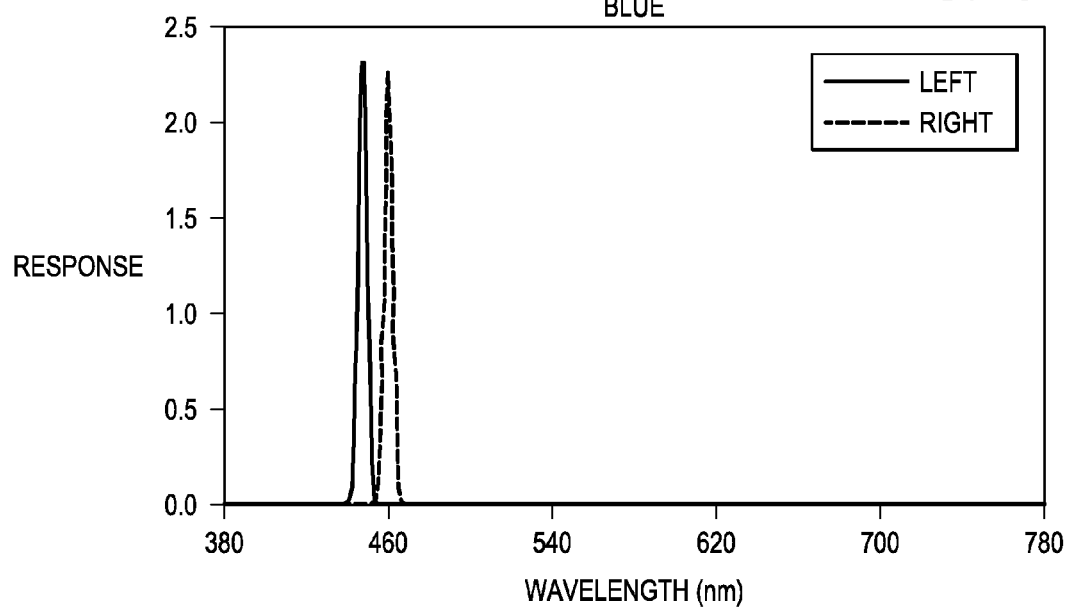
Figure 20:
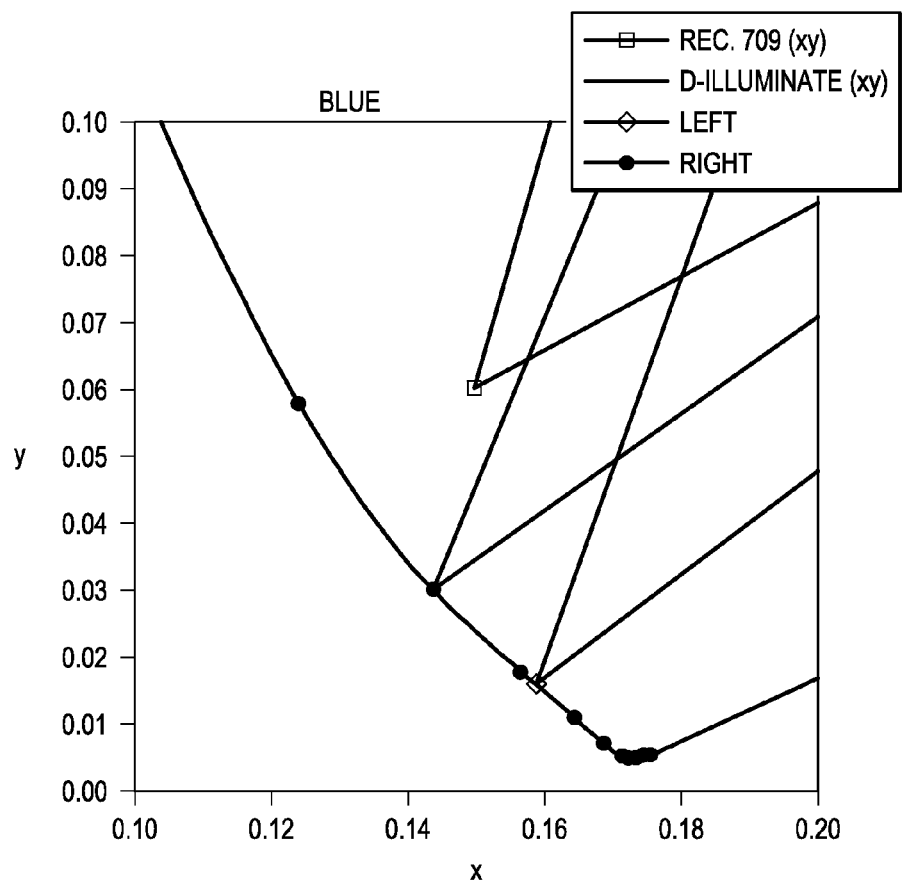

FIGS. 13 and 14 show the two reds created by the filter wheel. FIGS. 15 and 16 show the two greens created by the filter wheel. FIGS. 17 and 18 show the two yellows created by the filter wheel. The BrilliantColor™ algorithms recapture the yellows and spokes. FIGS. 19 and 20 show the two blues created by electronically selecting between the 448 nm and 460 nm lasers. In this implementation, when the blue color imaging for left or right eye occurs only the bank of lasers corresponding to one wavelength is illuminated (although both banks can be illuminated for the pumping of the other color generating phosphors), and only the filters in the glasses discriminate between the two blues. (In other implementations, both laser wavelengths can be turned on when either blue is being images, with the filter wheel used for the discrimination of which wavelength is used for illuminating the display surface.)

Figure 21:
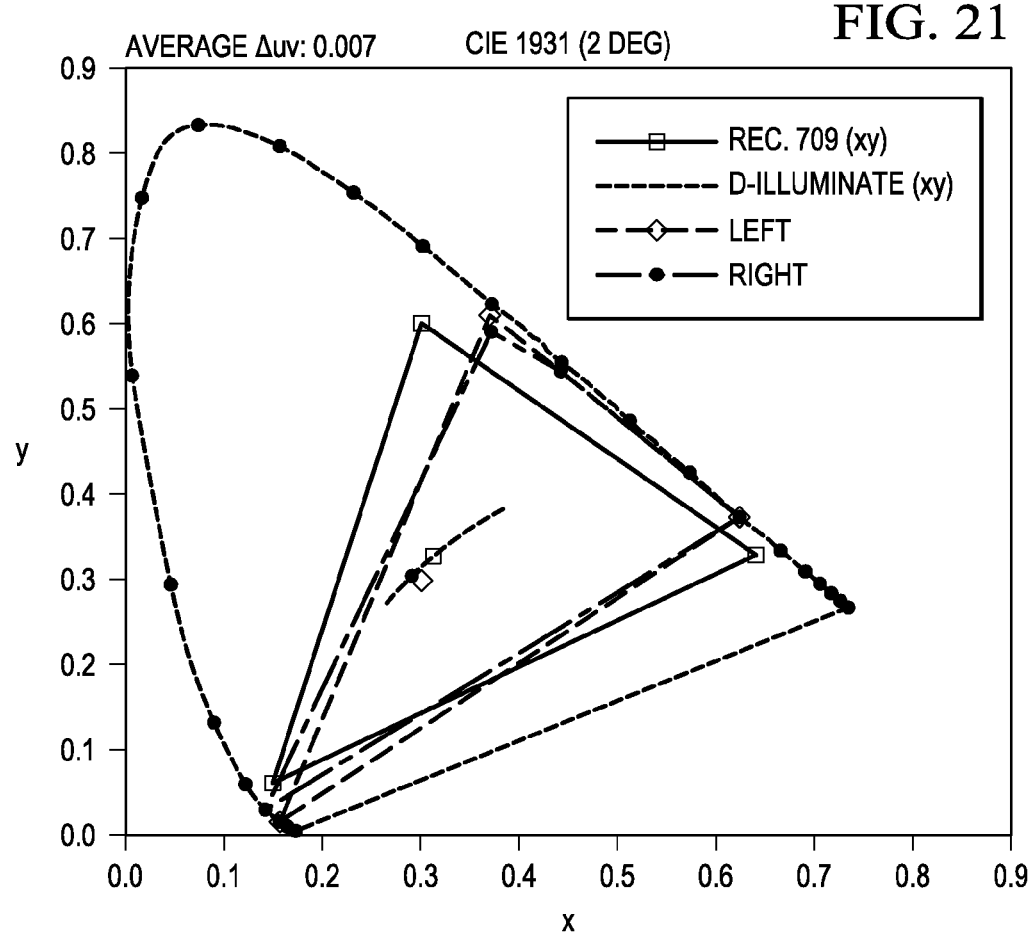
FIGS. 21 and 22 illustrate example color performances.
Figure 22:
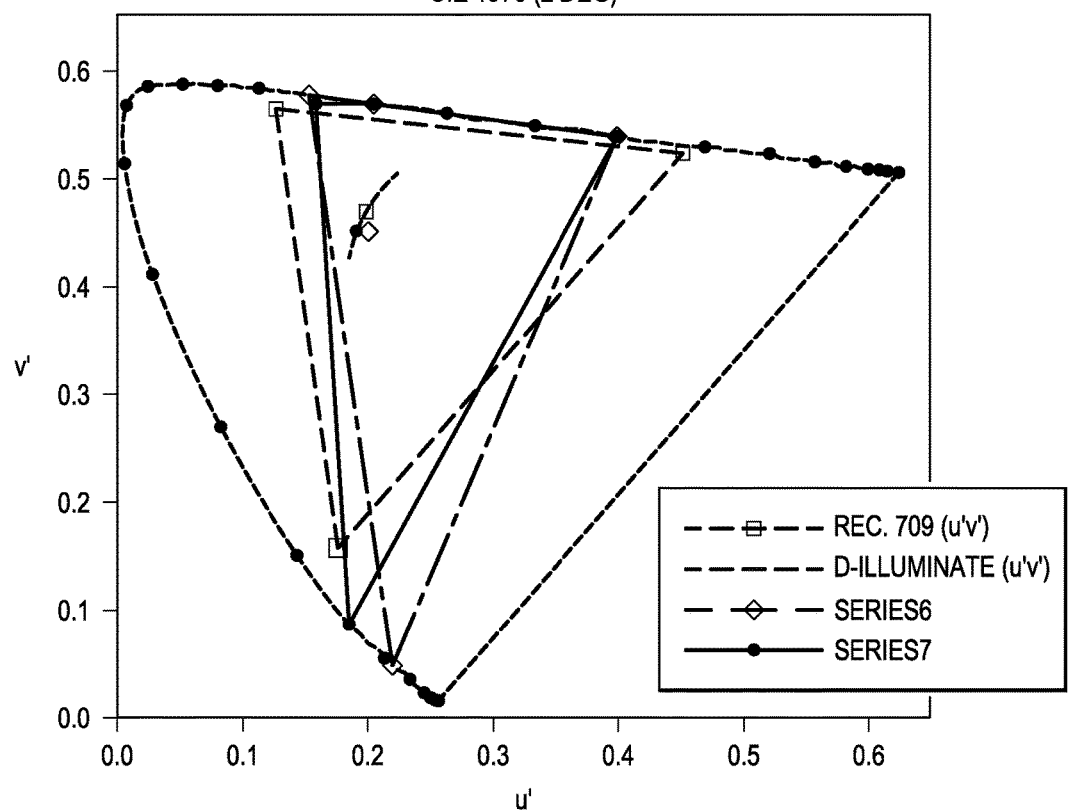

FIGS. 21-22 illustrate example color performances.

Figure 23:
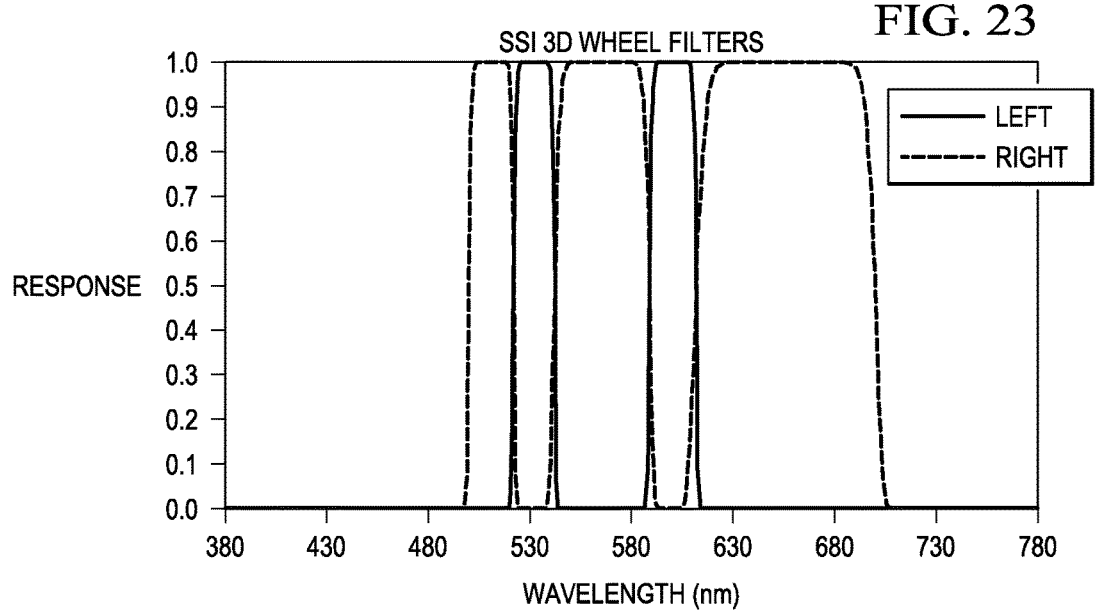
FIG. 23 illustrates example characteristics of the filters for the right and left eye filters of the filter wheel.

FIG. 23 illustrates example characteristics of the filters for the right and left eye filters of the filter wheel.

Figure 24:
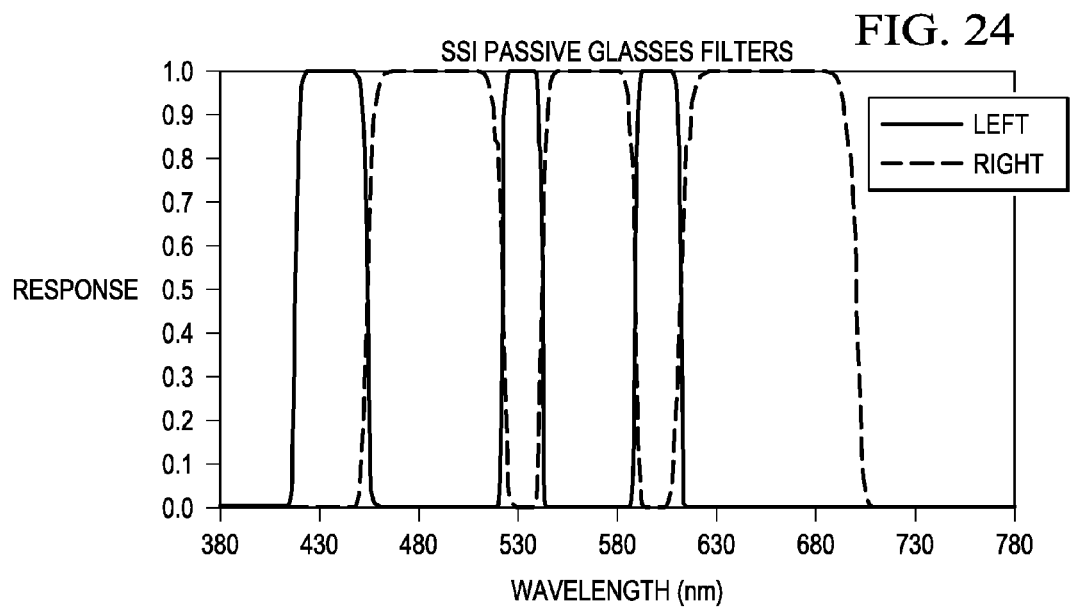
FIG. 24 illustrates example characteristics for the filters for the right and left eye lenses of the passive glasses. The glasses have the same filter cutoffs as the filters of the filter wheel, with the addition of a filter band to separate the two laser bands, 445 nm and 460 nm.

FIG. 24 illustrates example characteristics for the filters for the right and left eye lenses of the passive glasses. The glasses have the same filter cutoffs as the filters of the filter wheel, with the addition of a filter band to separate the two laser bands, 445 nm and 460 nm.

Figure 25:
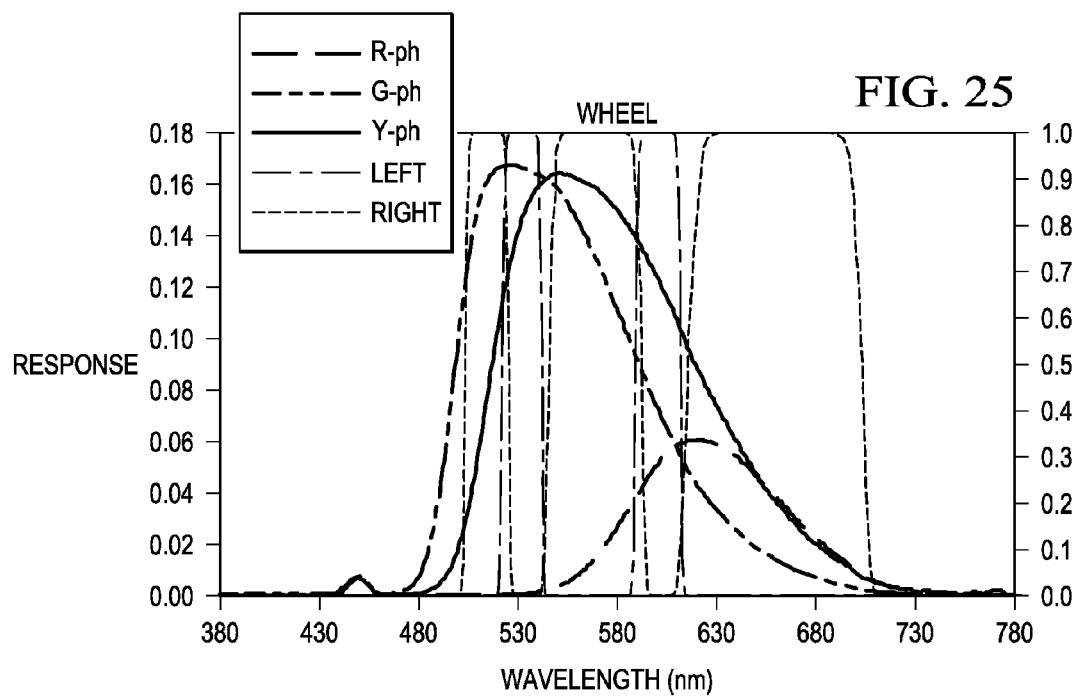
FIG. 25 illustrates the spectral energy from the phosphor wheel and the filter wheel filters overlaid.

FIG. 25 illustrates the spectral energy from the phosphor wheel and the filter wheel filters overlaid.

The DDP4421 has dual PCC color correction registers that enable individual left/right eye color correction. This allows for white point and individual color matching for the individual left and right eyes. Brightness matching can be accomplished either using laser current or PCC color control With the advancement of phosphor technology, such as advancements in quantum dot phosphors, instead of using a filter wheel and repeating the sequence of phosphors for yellow, red and green, the filter wheel may be omitted with phosphors of different yellow, red and green light emission characteristics used for the repetition of the colors.

Those skilled in the art to which the invention relates will appreciate that other modifications may be made to the described embodiments, and yet further embodiments realized, within the scope of the invention to be claimed.

What is claimed is:

1. An image projection system, comprising:
   at least one light source to emit laser light having a first laser wavelength and a second laser wavelength;
   a first rotatable member including: a first phosphor segment to emit light of a first wavelength range in response to the emitted laser light having the first laser wavelength; a second phosphor segment to emit light of a second wavelength range in response to the emitted laser light having the second laser wavelength; and a light transmission segment to transmit the emitted laser light; and
   a second rotatable member including a light selection segment to pass: the emitted light of a selected one of the first and second wavelength ranges, while blocking light from an unselected one of the first and second wavelength ranges; and the transmitted laser light having a selected one of the first and second laser wavelengths;
   the light selection segment of the second rotatable member including: a first light selection segment to pass the emitted light of the first wavelength range and simultaneously block the emitted light of the second wavelength range during a first time period; and a second light selection segment to pass the emitted light of the second wavelength range and simultaneously block the emitted light of the first wavelength range during a second time period non-overlapping with the first time period.

2. An image projection system, comprising:
   at least one light source to emit laser light having a first laser wavelength and a second laser wavelength;
   a first rotatable member including: a first phosphor segment to emit light of a first wavelength range in response to the emitted laser light having the first laser wavelength; a second phosphor segment to emit light of a second wavelength range in response to the emitted laser light having the second laser wavelength; and a light transmission segment to transmit the emitted laser light; and
   a second rotatable member including a light selection segment to pass: the emitted light of a selected one of the first and second wavelength ranges, while blocking light from an unselected one of the first and second wavelength ranges; and the transmitted laser light having a selected one of the first and second laser wavelengths;
   the light selection segment of the second rotatable member including: a first light selection segment to pass the transmitted laser light having the first laser wavelength and simultaneously block the transmitted laser light having the second laser wavelength during a first time period; and a second light selection segment to pass the transmitted laser light having the second laser wavelength and simultaneously block the transmitted laser light having the first laser wavelength during a second time period non-overlapping with the first time period.

3. The image projection system of claim 2, wherein:
   the first light selection segment is configured to pass the emitted light of the first wavelength range and simultaneously block the emitted light of the second wavelength range during the first time period; and
   the second light selection segment is configured to pass the emitted light of the second wavelength range and simultaneously block the emitted light of the first wavelength range during the second time period.

4. The image projection system of claim 2, wherein the first wavelength range is controlled by the first laser wavelength and the second wavelength range is controlled by the second laser wavelength.

5. The image projection system of claim 2, further comprising:
   at least one light directing optics element positioned to direct the laser light transmitted by the first rotatable member back to a location from which the first rotatable member receives the laser light.

6. An image projection system, comprising:
   at least one light source to emit laser light;
   a first rotatable member including: at least one phosphor segment to emit light of a selected wavelength range in response to the emitted laser light; and a light transmission segment to transmit the emitted laser light;
   a second rotatable member including a light selection segment to pass: the emitted light of the selected wavelength range, while blocking light from an unselected wavelength range; and the transmitted laser light; and
   a dichroic optical element positioned optically between the first rotatable member and the second rotatable member, the dichroic optical element including:
     a first surface positioned to reflect the laser light from the light source to the first rotatable member; and
     a second surface positioned to: transmit the emitted light from the first rotatable member to the second rotatable member; and reflect the laser light transmitted from the first rotatable member to the second rotatable member.

7. An image projection system, comprising:
   a source to emit laser light of a first color having a first laser wavelength and a second laser wavelength different from the first laser wavelength;
   a phosphor light emitter including: a first phosphor segment to emit phosphor light of a second color having a first phosphor wavelength when excited by the laser light having the first laser wavelength; and a second phosphor segment to emit phosphor light of the second color having a second phosphor wavelength different from the first phosphor wavelength when excited by the laser light having the second laser wavelength; and
   a three-dimensional (3D) filter optically coupled with the phosphor light emitter, the 3D filter including: a first filter segment to pass the phosphor light of the first phosphor wavelength and simultaneously block the phosphor light of the second phosphor wavelength during a first time period; and a second filter segment to pass the phosphor light of the second phosphor wavelength and simultaneously block the phosphor light of the first phosphor wavelength during a second time period non-overlapping with the first time period.

8. The image projection system of claim 7, wherein the first time period alternates with the second time period.

9. An image projection system, comprising
a source to emit laser light of a first color having a first laser wavelength and a second laser wavelength different from the first laser wavelength;
a phosphor light emitter including: a first phosphor segment to emit phosphor light of a second color having a first phosphor wavelength when excited by the laser light having the first laser wavelength; and a second phosphor segment to emit phosphor light of the second color having a second phosphor wavelength different from the first phosphor wavelength when excited by the laser light having the second laser wavelength; and
a three-dimensional (3D) filter optically coupled with the phosphor light emitter, the 3D filter including: a first filter segment to pass the laser light having the first laser wavelength and simultaneously block the laser light having the second laser wavelength during a first time period; and a second filter segment to pass the laser light having the second laser wavelength and simultaneously block the laser light having the first laser wavelength during a second time period non-overlapping with the first time period.

10. The image projection system of claim 9, wherein:
the first filter segment is configured to pass the phosphor light of the first phosphor wavelength and simultaneously block the phosphor light of the second phosphor wavelength during the first time period; and
the second filter segment is configured to pass the phosphor light of the second phosphor wavelength and simultaneously block the phosphor light of the first phosphor wavelength during the second time period.

11. The image projection system of claim 9, wherein:
the laser light is of a first color including a blue color; and
the phosphor light is of a second color including a green color and a red color.

12. An image projection system, comprising:
a source to emit laser light of a first color having a first laser wavelength and a second laser wavelength different from the first laser wavelength; and
a phosphor light emitter including: a first phosphor segment to emit phosphor light of a second color having a first phosphor wavelength when excited by the laser light having the first laser wavelength; and a second phosphor segment to emit phosphor light of the second color having a second phosphor wavelength different from the first phosphor wavelength when excited by the laser light having the second laser wavelength;
the first color including a blue color;
the second color including a green color and a red color;
the first phosphor segment being configured to emit: green phosphor light including a first green phosphor wavelength; and red phosphor light including a first red phosphor wavelength;
the second phosphor segment being configured to emit: green phosphor light including a second green phosphor wavelength different from the first green phosphor wavelength; and red phosphor light including a second red phosphor wavelength different from the first red phosphor wavelength.

13. The image projection system of claim 12, wherein the first laser wavelength is 448 nm, and the second laser wavelength is 460 nm.

14. An image projection system, comprising:
a source to emit laser light of a first color having a first laser wavelength and a second laser wavelength different from the first laser wavelength;
a phosphor light emitter including:
a first phosphor segment to emit phosphor light of a second color having a first phosphor wavelength when excited by the laser light having the first laser wavelength;
a second phosphor segment to emit phosphor light of the second color having a second phosphor wavelength different from the first phosphor wavelength when excited by the laser light having the second laser wavelength; and
a laser light transmission segment to transmit the laser light emitted by the source;
at least one light directing optics element positioned to direct the laser light transmitted by the phosphor light emitter back to a location from which the phosphor light emitter receives the laser light; and
a three-dimensional (3D) filter optically coupled with the phosphor light emitter, the 3D filter including: a first filter segment to pass the phosphor light of the first phosphor wavelength and simultaneously block the phosphor light of the second phosphor wavelength during a first time period; and a second filter segment to pass the phosphor light of the second phosphor wavelength and simultaneously block the phosphor light of the first phosphor wavelength during a second time period non-overlapping with the first time period.

15. An image projection system, comprising:
a source to emit laser light of a first color having a first laser wavelength and a second laser wavelength different from the first laser wavelength;
a phosphor light emitter including:
a first phosphor segment to emit phosphor light of a second color having a first phosphor wavelength when excited by the laser light having the first laser wavelength;
a second phosphor segment to emit phosphor light of the second color having a second phosphor wavelength different from the first phosphor wavelength when excited by the laser light having the second laser wavelength; and
a laser light transmission segment to transmit the laser light emitted by the source;
at least one light directing optics element positioned to direct the laser light transmitted by the phosphor light emitter back to a location from which the phosphor light emitter receives the laser light; and
a three-dimensional (3D) filter optically coupled with the phosphor light emitter, the 3D filter including: a first filter segment to pass the transmitted laser light having the first laser wavelength and simultaneously block the transmitted laser light having the second laser wavelength during a first time period; and a second filter segment to pass the transmitted laser light having the second laser wavelength and simultaneously block the transmitted laser light having the first laser wavelength during a second time period non-overlapping with the first time period.

16. The image projection system of claim 15, wherein:
the first filter segment is configured to pass the phosphor light of the first phosphor wavelength and simultaneously block the phosphor light of the second phosphor wavelength during the first time period; and
the second filter segment is configured to pass the phosphor light of the second phosphor wavelength and simultaneously block the phosphor light of the first phosphor wavelength during the second time period.

17. The image projection system of claim 1, wherein the first wavelength range is controlled by the first laser wavelength, and the second wavelength range is controlled by the second laser wavelength.

18. The image projection system of claim 1, further comprising:
- at least one light directing optics element positioned to direct the laser light transmitted by the first rotatable member back to a location from which the first rotatable member receives the laser light.

19. The image projection system of claim 7, wherein:
the laser light is of a first color including a blue color; and
the phosphor light is of a second color including a green color and a red color.

20. The image projection system of claim 7, wherein the first laser wavelength is 448 nm, and the second laser wavelength is 460 nm.

21. The image projection system of claim 9, wherein the first time period alternates with the second time period.

22. The image projection system of claim 9, wherein the first laser wavelength is 448 nm, and the second laser wavelength is 460 nm.

* * * * *